United States Patent [19]
Yoon

[11] Patent Number: 5,577,901
[45] Date of Patent: Nov. 26, 1996

[54] COMPRESSOR WITH VALVE UNIT FOR CONTROLLING SUCTION AND DISCHARGE OF FLUID

[75] Inventor: Deokyoung Yoon, Seoul, Rep. of Korea

[73] Assignee: Samsung Electronics, Co., Ltd., Kyungki-do, Rep. of Korea

[21] Appl. No.: 531,089

[22] Filed: Sep. 20, 1995

[30] Foreign Application Priority Data

Feb. 14, 1995 [KR] Rep. of Korea .................. 95-2683

[51] Int. Cl.⁶ .................................................. F04B 39/10
[52] U.S. Cl. ...................... 417/571; 137/856; 137/851; 137/516.11
[58] Field of Search ........................... 417/571; 137/855, 137/856, 857, 516.11, 516.13

[56] References Cited

U.S. PATENT DOCUMENTS

| | | | |
|---|---|---|---|
| 2,161,769 | 6/1939 | Trask | 137/857 |
| 4,911,614 | 3/1990 | Kawai et al. | 417/571 |
| 5,074,768 | 12/1991 | Kawamura et al. | 417/571 |
| 5,380,176 | 1/1995 | Kikuchi et al. | 137/856 |

*Primary Examiner*—Charles G. Freay
*Attorney, Agent, or Firm*—Burns, Doane, Swecker & Mathis, LLP

[57] ABSTRACT

A compressor whose structure is simple, assembling is easy and refrigeration efficiency is improved.

A valve unit of the compressor includes a valve plate 230 in which a suction hole 231 and a discharge hole 234 are formed, a suction valve plate 220 disposed between valve plate 230 and a cylinder block 17, formed with a first opening and closing piece 221 for opening and closing the suction hole, and a discharge plate 240 disposed between valve plate 230 and cylinder head 25, formed with a second opening and closing piece for opening and closing the discharge hole.

6 Claims, 4 Drawing Sheets

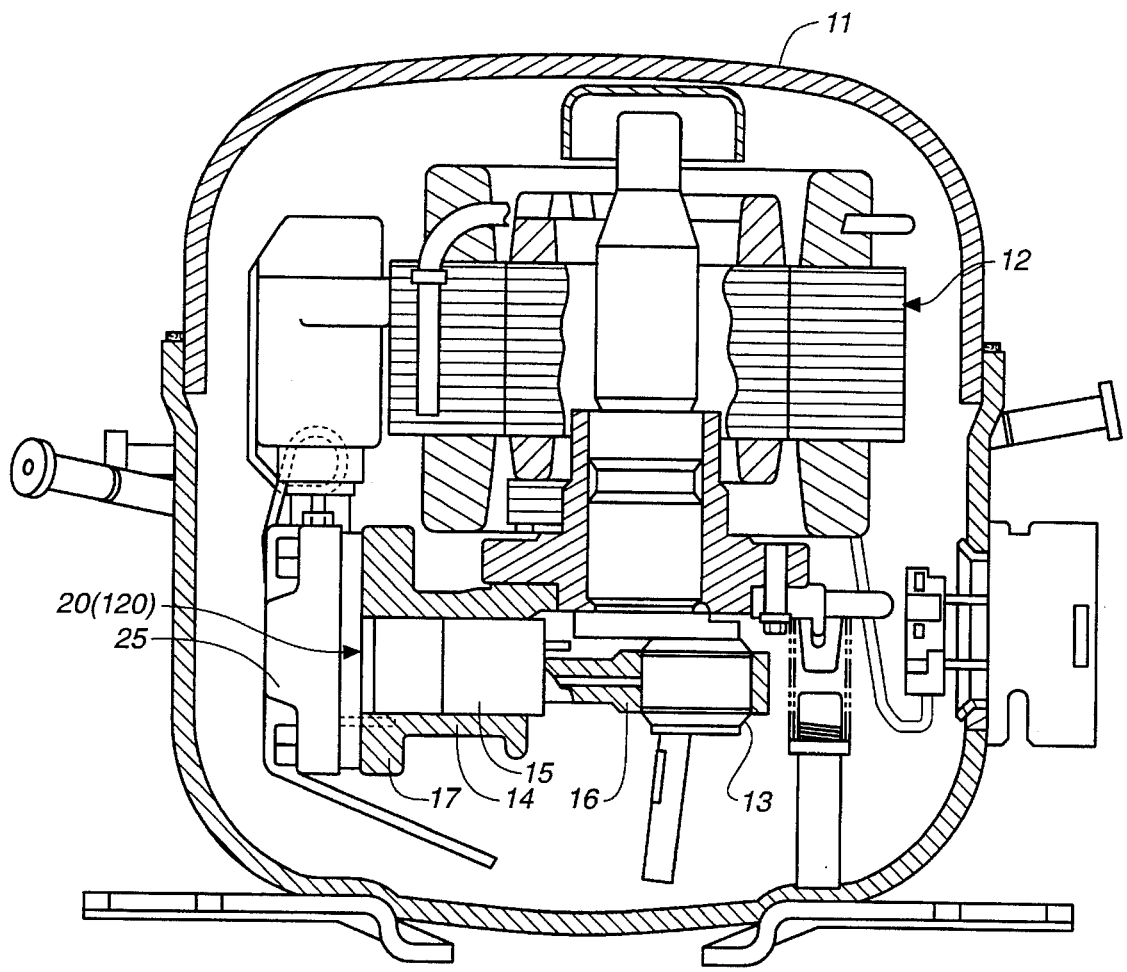
FIG._1
(PRIOR ART)

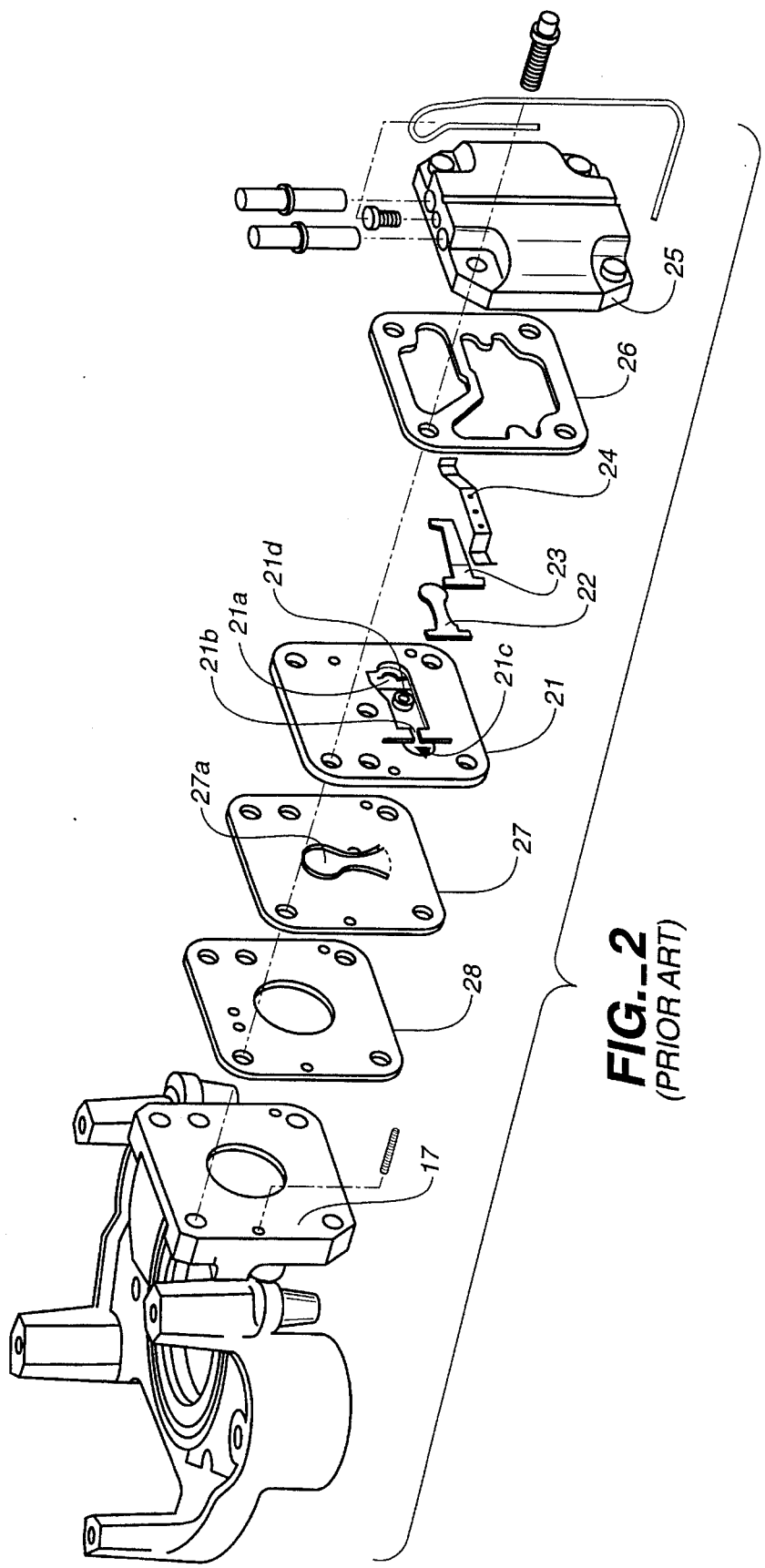
FIG._2
(PRIOR ART)

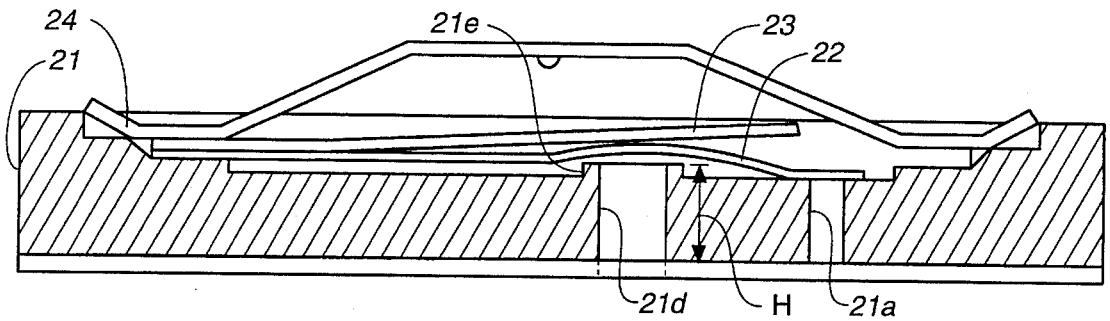
FIG._3
(PRIOR ART)
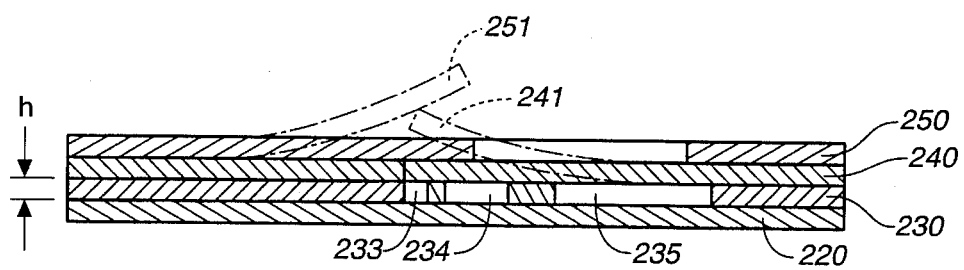
FIG._5

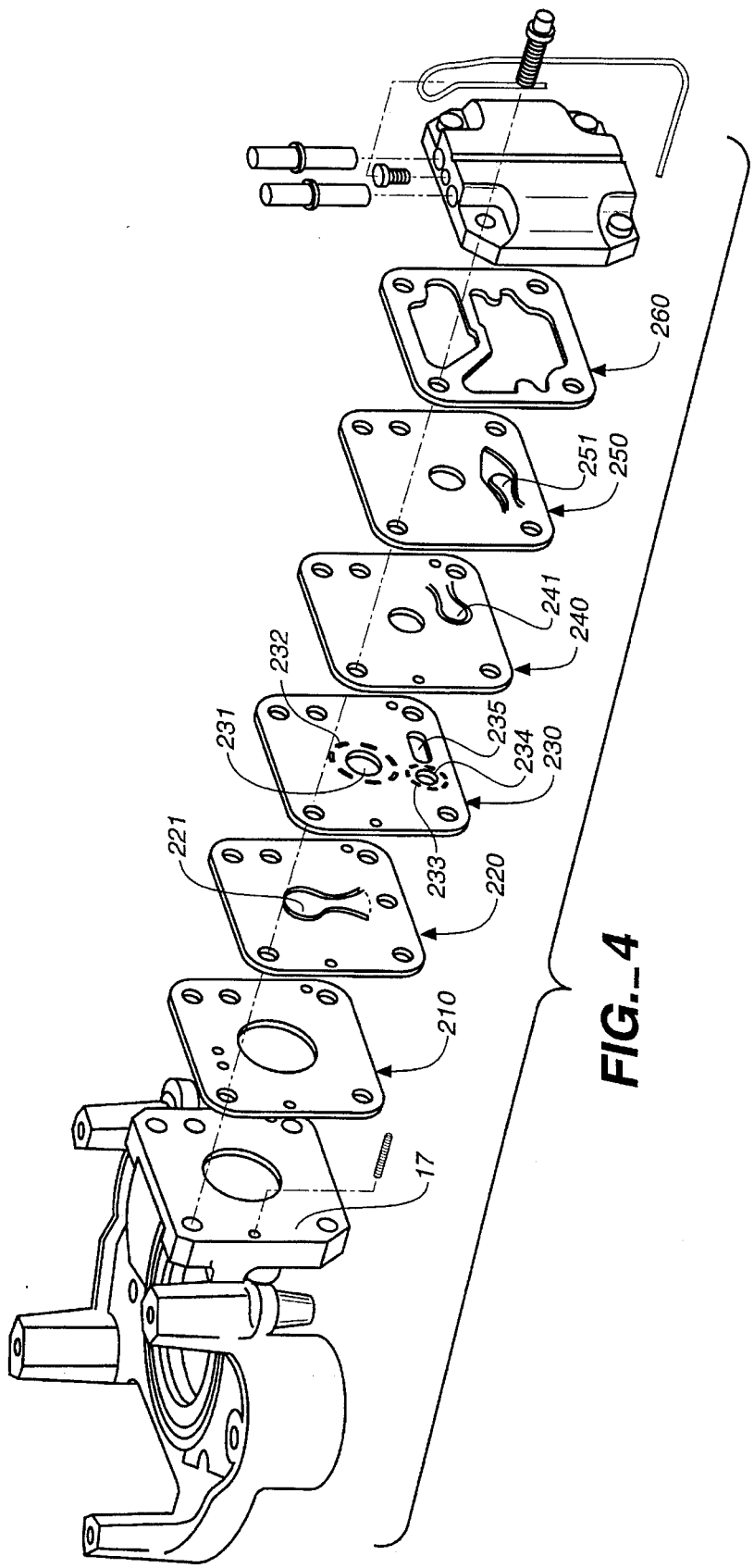
FIG._4

COMPRESSOR WITH VALVE UNIT FOR CONTROLLING SUCTION AND DISCHARGE OF FLUID

BACKGROUND OF THE INVENTION

The present invention relates to a compressor, and more particularly, to a compressor having an improved structure of a valve unit for controlling the suction and discharge of fluid.

There are several kinds of conventional compressors such as a scroll type compressor, a rotary type compressor, a wobble plate type compressor, or a piston reciprocating type compressor according to its driving method. FIG. 1 is a schematic of one example of a reciprocating airtight type compressor among such compressors.

The reciprocating airtight type compressor has a motor 12, a cylinder 14, a piston 15 reciprocating inside cylinder 14, a crank shaft 13 rotated by motor 12 and a connecting rod 16 for connecting piston 15 and crank shaft 13, inside an airtight main body 11. Reference numeral 20 denotes a valve unit.

In the airtight reciprocating compressor structured as above, piston 15 reciprocates inside cylinder 14 by the drive of motor 12 to compress fluid.

A valve unit 20 for controlling the suction and discharge of fluid into and from a compression chamber of the cylinder is mounted between a cylinder block 17 and a cylinder head 25. Referring to FIGS. 1 and 2, valve unit 20 comprises a valve plate 21 in which a suction hole 21d, a groove portion 21c having a predetermined depth on which a valve coupling groove 21b and discharge hole 21a are formed, a discharge valve 22 for opening and closing discharge hole 21a supported by coupling groove 21b of groove portion 21c at its one end, a stop 23 for supporting discharge valve 22 and defining an opening and closing region of discharge valve 22, a supporting plate 24 for preventing the detachment of discharge valve 22 and stop 23 from groove portion 21c, and a suction valve 27 and a gasket 28 disposed between valve plate 21 and cylinder block 17. An annular shoulder 21e for preventing a backward flow of refrigerant gas is formed on an edge of discharge hole 21a. Reference numeral 26 denotes a gasket interposed between valve plate 21 and a cylinder head 25.

The conventional compressor 1 having such a structure operates as follows. At the time of a suction stroke, piston 15 is moved to a bottom dead point so that vacuum is formed in the compression chamber. As a result, a suction valve plate 27a is opened due to the suction force of the vacuum so that the fluid flows into the compression chamber through suction hole 21d. At this time, discharge valve 22 is maintained to 20 block discharge hole 21a.

In this state, an exhaustion stroke in which the fluid is compressed while piston 15 is moved to a top dead center and the compressed fluid is discharged, proceeds. In such a process, suction valve plate 27a blocks suction hole 21d and discharge valve 22 facing discharge hole 21a is opened by the pressure of the compressed fluid so that the fluid is discharged. Then, when piston 15 is moved to the bottom dead point again, discharge valve 22 is closed and suction valve plate 27a is opened. A continuous compression operation is performed by the above reciprocating of piston 15. The conventional compressor has annular shoulder 21e formed on the edge of discharge hole 21a for preventing the discharged fluid (the refrigerant gas) from flowing reversely, as shown in FIGS. 2 and 3. Accordingly, the refrigerant gas is remained as much as the volume corresponding to the thickness (H) of annular shoulder 21e plus valve plate 21.

Accordingly, since new refrigerant gas and the remaining refrigerant gas are mixed and reexpanded at the time of a subsequent suction stroke, there is a problem in that a refrigeration efficiency is lowered.

SUMMARY OF THE INVENTION

To solve the above problem, it is an object of the present invention to provide a compressor whose structure is improved so that refrigerant gas is not remained after the refrigerant gas is discharged.

It is another object of the present invention to provide a compressor whose structure is simple and which is easy to assemble.

To accomplish the above objects, there is provided a compressor comprising: a cylinder and a cylinder block having a compression chamber in which fluid is compressed by reciprocation of a piston; a cylinder head coupled to the cylinder block; and a valve unit disposed between the cylinder block and the cylinder head, for controlling suction and discharge of the fluid, wherein the valve unit includes: a valve plate in which a suction hole and a discharge hole are formed; a suction valve plate disposed between the valve plate and the cylinder block, and formed with a first opening and closing piece for opening and closing the suction hole; and a discharge valve plate disposed between the valve plate and the cylinder head, and formed with a second opening and closing piece for opening and closing the discharge hole.

The first and second annular holes are formed adjacent to the edges of the suction hole and the discharge hole facing the edges of the first and second opening and closing pieces. And, a support plate in which a supporting piece for supporting the second opening and closing pieces to prevent an excessive elastic deformation of the second opening and closing pieces, is formed, is further provided.

It is preferable that the first and second opening and closing pieces and a supporter are integrally formed by the lancing process of each plate. It is also preferable that the valve plate is formed to have the approximately same thickness as the thickness of the suction/discharge valve plates. In this case, the space volume of the discharge hole is formed relatively smaller than that of the conventional discharge hole.

According to the characteristic of the present invention as above, since the first and second opening and closing pieces are integrally formed in each plate, there are advantages in that the assembly efficiency is improved and the management of the parts is easy. Also, since the thickness of the discharge hole applied to the compressor of the present invention is smaller than that of the conventional discharge hole, there is an advantage in that the amount of the remaining refrigerant gas is small, to thereby improve the refrigeration efficiency.

BRIEF DESCRIPTION OF THE DRAWINGS

The above objects and advantages of the present invention will become more apparent by describing in detail a preferred embodiment thereof with reference to the attached drawings in which:

FIG. 1 is a schematic section of a general compressor.

FIG. 2 is an exploded perspective view of a valve unit of the conventional compressor.

FIG. 3 is a section of the coupled essential parts of FIG. 2.

FIG. 4 is an exploded perspective view of the valve unit according to the present invention.

FIG. 5 is a section of the coupled essential parts of the valve unit shown in FIG. 4.

DETAILED DESCRIPTION OF THE INVENTION

A compressor according to one embodiment of the present invention has essential elements of the conventional compressor. As explained above referring to FIG. 1, the compressor comprises motor 12, cylinder 14, piston 15 reciprocating inside cylinder 14, crank shaft 13 rotated by motor 12 and connecting rod 16 for connecting piston 15 and crank shaft 13, inside airtight main body 11. In the airtight type reciprocating compressor structured as above, while piston 15 reciprocates inside cylinder 14 according to the drive of motor 122 to compress fluid.

A valve unit 120 as a characteristic of the present invention is mounted between cylinder block 17 and cylinder head 25, for controlling the suction and discharge of fluid into and from a compression chamber of the cylinder. Referring to FIGS. 4 and 5, valve unit 120 includes a valve plate 230 in which a suction hole 231 and a discharge hole 234 are formed, a suction valve plate 220 disposed between valve plate 230 and cylinder block 17, integrally formed with a first opening and closing piece 221 for opening and closing suction hole 231 and an discharge valve plate 240 disposed between valve plate 230 and cylinder head 25, integrally formed with a second opening and closing piece 241 for opening and closing discharge hole 234. Supporting means for preventing an excessive elastic deformation of second opening and closing piece 241 elastically deformed by the refrigerant gas compressed inside the cylinder is further provided. The supporting means is a supporting plate 250 disposed between discharge valve plate 240 and cylinder head 25. A part of supporting plate 250 is elastically contacted with second opening and closing piece 241. Supporting plate 250 has a supporting piece 251 formed by the lancing process to contact second opening and closing piece 241.

First and second opening and closing pieces 221 and 241 are integrally formed in suction/discharge plates 220 and 240 respectively by the lancing process, and can be elastically deformed.

A plurality of first and second holes 232 and 233 are formed in a circular arrangement adjacent to the edges of suction hole 231 and discharge hole 234 in order to enhance the close adhesion of each first and second opening and closing piece 221 and 241 to each edge of suction hole 231 and discharge hole 234, respectively. Also, a third hole 235 is formed in valve plate 230 facing second opening and closing piece 241 so that second opening and closing piece 241 shuts further tightly discharge hole 234.

The thickness of discharge hole 234 is about 0.5–1.5 mm, which is thinner than around 2 mm of the thickness of the above-explained conventional discharge hole.

Reference numerals 210 and 260 are gaskets disposed between cylinder block 17 and valve unit 120, and between cylinder head 25 and valve unit 120, for preventing the leakage of the refrigerant gas.

The compressor according to the present invention having such a structure operates as follows.

At the time of suction stroke, piston 15 moves to a bottom dead point so that the vacuum is formed in the compression chamber. First opening and closing piece 221 is elastically deformed and opened due to the suction force of the vacuum so that the refrigerant gas flows into the compression chamber through suction hole 231. At this time, second opening and closing piece 241 maintains the state of blocking discharge hole 234. Since the vacuum inside the cylinder is applied to second opening and closing piece 241 through second hole 233 and third hole 235, the close adhesion force of second opening and closing piece 241 to discharge hole 234 is enhanced.

At this state, the exhaustion stroke in that piston 12 moves to the top dead center so that the refrigerant gas is compressed and the compressed refrigerant gas is discharged to the outside, proceeds. In such a process, first opening and closing piece 221 blocks suction hole 231 by the pressure of the compressed refrigerant gas, and second opening and closing piece 241 is elastically deformed by the pressure of the refrigerant gas to open discharge hole 234.

When piston 15 moves to the bottom dead point, again, the open discharge hole 234 is closed by second opening and closing piece 241, and suction hole 231 is opened by first opening and closing piece 221. A continuous compression operation is realized by the reciprocation of piston 15.

Since second opening and closing piece 241 deformed elastically by the pressure of the refrigerant gas is supported by supporting piece 251, it is possible to prevent the excessive elastic deformation.

The compressor according to the present invention as explained above has advantages as follows.

Firstly, since the thickness (0.5–1.0 mm) of discharge hole 234 is thinner than that (2 mm) of the conventional discharge hole, the amount of the refrigerant gas remained in discharge hole 234 is smaller than that of the refrigerant gas in the prior art and accordingly refrigeration efficiency is improved.

Secondly, since each valve plate 220 and 240 integrally formed with first and second opening and closing pieces for opening and closing suction hole 231 and discharge hole 234 respectively, the assembly becomes easy.

What is claimed is:

1. A compressor comprising:
    a cylinder and a cylinder block having a compression chamber in which fluid is compressed by reciprocation of a piston;
    a cylinder head coupled to said cylinder block; and
    a valve unit disposed between said cylinder block and said cylinder head, for controlling suction and discharge of the fluid,
    wherein the valve unit includes:
        a valve plate in which a suction hole, a discharge hole, a plurality of first holes formed around the edge of the suction hole and a plurality of second holes formed around the edge of the discharge hole are formed;
    a suction valve plate disposed between said valve plate and the cylinder block, and formed with a first opening and closing piece for opening and closing the suction hole and the plurality of first holes; and
    a discharge valve plate disposed between said valve plate and said cylinder head, and formed with a second opening and closing piece for opening and closing the discharge hole and the plurality of second holes.

2. A compressor according to claim 1, wherein a support plate formed with a supporting piece for supporting the second opening and closing piece to define an elastic deformation of the second opening and closing piece is further provided.

3. A compressor according to claim 2, wherein said supporting piece is formed integral with said support plate.

4. A compressor according to claim 1, wherein a third hole facing said second opening and closing piece is formed near the edge of said discharge hole.

5. A compressor according to claim 1, wherein said first opening and closing piece is formed integral with said suction valve plate.

6. A compressor according to claim 1, wherein said second opening and closing piece is formed integral with said discharge valve piece.

* * * * *